United States Patent Office.

JOHN HESSING, OF PATERSON, NEW JERSEY.

Letters Patent No. 110,461, dated December 27, 1870.

IMPROVEMENT IN NON-CONDUCTING COMPOUNDS FOR COATING STEAM-BOILERS, &c.

The Schedule referred to in these Letters Patent and making part of the same.

*To all whom it may concern:*

Be it known that I, JOHN HESSING, of Paterson, in the county of Passaic and State of New Jersey, have invented a new and improved Non-conducting Composition; and I do hereby declare that the following is a full, clear, and exact description thereof, which will enable others skilled in the art to make and use the same.

This invention relates to a new and improved non-heat-conducting compound, suitable for covering marine, locomotive, stationary, and other steam-boilers, cylinders, pipes, &c., the said compound being as follows:

Seven hundred and fifty parts clay, thirty-five parts cow's hair, forty parts soot, forty parts oil or grease, fifty parts cork, (ground,) forty-two parts bone, (ground,) thirty-five parts oil-cakes, eight parts glue.

These parts compounded from a pasty mass, which may be laid on with a trowel or other suitable means, and constitutes a very serviceable non-conductor.

Having thus described my invention,

I claim as new and desire to secure by Letters Patent—

The improved compound, consisting of the ingredients and compounded substantially in the manner specified.

The above specification of my invention signed by me this 18th day of August, 1870.

JOHN HESSING.

Witnesses:
GEO. W. MABEE,
ALEX. F. ROBERTS.